3,056,833
PROCESS FOR PRODUCING FORMIC ACID
Carl E. Heath, Nixon, N.J., assignor to Esso Research and Engineering Company, a corporation of Delaware
No Drawing. Filed Dec. 30, 1959, Ser. No. 862,789
12 Claims. (Cl. 260—533)

This invention relates to a process for preparing formic acid. In particular this invention relates to a process for preparing formic acid directly from ethane by a novel vapor-phase oxidation technique. More particularly, this invention relates to the production of formic acid by the oxidation of gaseous ethane at a temperature in the range of about 200° to 400° F. with a gas containing molecular oxygen and ozone in a reaction zone having a surface to volume ratio of above about 2 cm.$^{-1}$. The term "cm.$^{-1}$" is used herein as it is conventionally employed in the literature to designate the ratio of square centimeters of surface/cubic centimeters of volume.

Formic acid is, of course, a well-known commercial chemical which finds utility in various fields. For example, it is employed in textile dyeing and finishing, as a reagent for detecting nitrates in water, in the analysis of essential oils, etc.

Formic acid has been prepared by the acid hydrolysis of methyl formate, sodium formate acidification and as a by-product of acetaldehyde product.

In the several processes for the oxidation of ethane known to the art various oxygenated products are claimed. These include by way of example ethylene oxide, U.S. Patent 2,775,510; formaldehyde, U.S. Patent 1,729,711; acetaldehyde, methanol, etc., U.S. Patent 1,991,344.

It has now been found that formic acid can be prepared directly from ethane with unexpectedly high selectivities by oxidation under certain critical conditions.

The reaction may be carried out in conventional reaction equipment having a surface to volume ratio in the reaction zone above about 2, preferably 2–5, and most preferably 3–4 cm.$^{-1}$. The particular form of the reactor is not critical. For example, a very simple type of reactor would comprise an open tube which is maintained, by external heat exchange, at the desired temperature level. In addition to external heat exchange, an inert gas diluent is employed to aid in temperature control. Gases such as $N_2$, $CO_2$ and the like are suitable. The total oxidizing gas mixture should include in addition to the oxygen and ozone components about 50 to 95 volume percent of such inert gas. The reactant ethane, the oxygen and ozone are then simply passed through the tube at a predetermined space velocity. The gaseous reaction product mixture is then condensed to form a liquid mixture of oxygenated products which is separated into its component parts. There are, however, more complex oxidation reactors which are amenable to this process. Those skilled in the art will realize that various modifications in reactor design may be made wherein single or multiple reaction zones, packed or unpacked chambers employing single or multiple reactant inlets may be advantageously employed within the scope of this invention so long as the surface to volume ratio requirements, hereinbefore set forth, are met. The preferred surface is stainless steel. The term "stainless steel" is used herein to designate non-corrosive chromium-nickel alloy steels. Preferably such steels have combined therein about 10–20 wt. percent chromium, 5 to 15 wt. percent nickel in addition to the normal steel components of iron and small amounts, i.e. up to 1.75 wt. percent, carbon. Minor amounts of other metals such as manganese and molybdenum may also be combined in such steels. One such steel commonly used for this purpose is known as "type 316 stainless steel" and has the following weight percent composition: chromium 16–18, nickel 10–14, molybdenum 1.75–2.75, and carbon 0.1 maximum with iron comprising the balance. Other non-corrosive metals of Groups VI, VII and VIII of the periodic table, as reported by the Commission of the International Union of Chemistry 1949, may be used but the aforementioned chromium-nickel alloy steels are preferred.

The temperature at which the reaction is carried out is critical. Temperatures in the range of 200° to 400° F. are suitable. Temperatures in the range of 250° to 350 F. are preferred. At temperatures below 200° F. it becomes difficult to sustain the desired reaction. At temperatures above 400° F. the selectivity to formic acid falls sharply. Pressures in the range of 1 to 50, preferably 1 to 10, atmospheres may be used.

Another factor governing the conditions employed is the degree of conversion desired. With simple oxidation reactors where the temperature is difficult to control, it is advisable to maintain the conversion level rather low in order to avoid runaway temperatures. On the other hand, where more advanced oxidation reactors are used wherein good control of temperatures is possible, higher conversions may be obtained. The mole ratio of $O_2$ to ethane is preferably maintained between 0.2 to 1.0, preferably about 0.3 to 0.5. Ozone must be employed to effect the desired conversion of ethane to formic acid. Amounts in the range of about 1 to 5 volume percent based on oxygen may be employed. To obtain high selectivities to formic acid the concentration in the reaction zone should be maintained in the range of 0.5 to 2.5, preferably 0.5 to 1.5, wt. percent based on ethane present. The specific feed rates, contact time, oxygen, partial pressure and other conditions may vary somewhat according to the efficiency of the reactor employed.

The optimum contact time for this vapor phase reaction will vary according to the temperature, pressure and the oxidant mixture employed. For the simple open tube type reactor wherein the conversion is maintained at a low level, a contact time between 0.5 to 4 seconds is preferred. The conversion level is relatively unimportant since the off-gases may be recycled to the reactor after condensation of the oxy products. CO and $CO_2$ may be removed from the off-gases by absorption in diethanolamine solutions, etc. Unreacted oxygen and ethane may be recycled to the reactor where ozone may be added.

The preferred hydrocarbon feedstock is essentially pure ethane. However, a $C_1$—$C_4$ hydrocarbon stream containing a major amount of ethane may be satisfactorily employed.

In carrying out the process of this invention both the oxidizing gas and the ethane are preferably preheated to the desired temperature of reaction or slightly below and brought into contact with each other in a reaction zone maintained at the desired temperature of reaction. The ethane and oxidizing gas may be premixed and introduced into the reaction zone as a single stream or reach may be introduced into the reaction zone separately. The oxygenated products formed may be separated from unreacted ethane by scrubbing with water, or other conventional aqueous wash solutions or mixtures. Formic acid may then be separated from the gross oxygenated product by conventional distillation techniques and other conventional methods of separation.

The following example demonstrates the criticality of the conditions hereinbefore described. Conversion was deliberately maintained at a relatively low level, i.e. 5–10%, in order to avoid runaway temperature with a simple type of reactor.

*Example 1*

A mixture of air containing ozone and ethane, in an $O_2/C_2H_6$ mole ratio of 0.4 is preheated and passed through a chromium-nickel alloy steel tube (type 316-composition hereinbefore set forth) having a surface to volume ratio of about 3.0 cm.$^{-1}$ maintained at a temperature of 300° F. The 26 inch reaction tube employed has an internal diameter of about ¾ inch. A thermowell providing a like steel surface and having an external diameter of ¼ inch is positioned within the reaction zone. The concentration of ozone in the reaction zone based on the weight of ethane present is maintained at about 0.9 wt. percent. Contact time is about 2 seconds. The reaction product containing effluent is passed from the reactor to a condenser wherein liquid product is formed. The oxygenated product is washed with water containing about 0.1 wt. percent hydroquinone, separated and analyzed.

Analysis of the total oxygenated product reveals the selectivity to the various components thereof in terms of wt. percent on ethane converted to be as follows:

| | |
|---|---|
| Formic Acid | 71.1 |
| Acetaldehyde | 5.6 |
| Formaldehyde | 19.4 |
| Acetic Acid | 16.4 |

A second run is made with the single change being in the surface to volume ratio in the reaction zone. In this run the reactor tube surface to volume ratio is 0.8 cm.$^{-1}$. Analysis of the gross oxygenated product reveals a selectivity to formic acid (based on converted ethane) of about 27.5 wt. percent.

A third run is made with the single difference from run two being a decrease in the ozone concentration (based on the weight of ethane) from 0.9 wt. percent to 0.3 wt. percent. Analysis of the gross oxygenated product reveals a selectivity to formic acid (based on converted ethane) of about 18.3 weight percent.

A fourth run is made with the single difference from run one being an increase in temperature from 300° F. to 500° F. Analysis of the gross oxygenated product reveals a selectivity to formic acid (based on converted ethane) of about 8.7 wt. percent.

A fifth run is made with a reactor having a surface to volume ratio of 3 cm.$^{-1}$ as in run one except that here the reactor used has a squat cylindrical reaction zone having an internal diameter of 3.02 inches and a length of 1.5 inches, and packed with stainless steel gauze. Analysis of the gross oxygenated product obtained reveals a selectivity to formic acid (based on converted ethane) of about 69.74 wt. percent.

A sixth run is made with the single difference from run one being the use of a quartz lined reactor having a surface to volume ratio of 3 cm.$^{-1}$. Analysis of the gross oxygenated product reveals a selectivity to formic acid (based on converted ethane) of about 27.5 wt. percent.

A seventh run is made as in the first run except that an $O_2$ to ethane mole ratio of about 0.8 is employed. The selectivity to formic acid in the oxygenated product is substantially the same as in the first run.

Additional runs are made at 500° F. as in run four but using reactors wherein the reaction zone is coated with $B_2O_3$ and $MnO_2$ respectively. Selectivities to formic acid are 13.31 and 18.81 respectively.

What is claimed is:

1. A process for making formic acid which comprises contacting ethane and molecular oxygen in an $O_2$ to ethane mole ratio of 0.2 to 1 with 0.5 to 2.5 wt. percent ozone based on ethane in a reaction zone having a chromium-nickel alloy steel surface and a surface to volume ratio of at least 2 cm.$^{-1}$ at a temperature in the range of 200° to 400° F. and recovering formic acid.

2. A process in accordance with claim 1 wherein said surface to volume ratio is in the range of 3 to 4 cm.$^{-1}$.

3. A process in accordance with claim 1 wherein said temperature is in the range of 250° to 350° F.

4. A process in accordance with claim 1 wherein said $O_2$ to ethane mole ratio is in the range of 0.3 to 0.5.

5. A process in accordance with claim 1 wherein the concentration of ozone in said reaction zone is 0.5 to 1.0 wt. percent on ethane.

6. Process for making formic acid which comprises passing a feed comprising ethane, air and about 0.5 to 1.5 wt. percent ozone, based on the ethane in said feed, through a reactor having a chromium-nickel alloy steel surface and a surface to volume ratio of 2 to about 5 cm.$^{-1}$, the mole ratio of oxygen in said air to ethane being about 0.3 to 0.5, reacting said ethane and said ozone-containing air in the vapor phase at 250° to 350° F. and under about 1 to 10 atmospheres for about 0.5 to 4 seconds and recovering formic acid from the reactor effluent.

7. A process for making formic acid which comprises contacting a feed comprising ethane and a mixture of gases consisting essentially of 50 to 95 vol. percent inert gas and 5 to 50 vol. percent of an oxidant comprising molecular oxygen and 0.5 to 2.5 wt. percent ozone, based on the ethane in said feed, for about 0.5 to 4 seconds in a reactor having a chromium-nickel alloy steel surface and a surface to volume ratio of at least 2 cm.$^{-1}$ at temperatures of 250° to 350° F. and under pressures of about 1 to 10 atmospheres, the mole ratio of the molecular oxygen to the ethane being about 0.3 to 0.5, and recovering formic acid from the reactor effluent.

8. A process in accordance with claim 7 wherein said time is in the range of 2 to 3 seconds.

9. A process in accordance with claim 7 wherein said chromium-nickel alloy steel contains 10 to 20 wt. percent combined chromium and 5 to 15 wt. percent combined nickel.

10. A process in accordance with claim 7 wherein said temperature is in the range of 250° to 350° F.

11. A process in accordance with claim 7 wherein said surface to volume mole ratio is in the range of 2 to 5 cm.$^{-1}$.

12. A process in accordance with claim 7 wherein said gas mixture is air which contains 0.5 to 1.5 wt. percent ozone, based on ethane.

References Cited in the file of this patent

UNITED STATES PATENTS 1,991,344     Burke et al.     Feb. 12, 1935

OTHER REFERENCES

De Witt et al.: C.A., Vol. 42, page 857 (1948).
Fernandez: C.A., Vol. 39, page 2023 (1945).